Sept. 8, 1925.
G. R. RADLEY
1,552,446
ELECTRICAL CONTROL APPARATUS
Filed Aug. 21, 1919        2 Sheets-Sheet 1
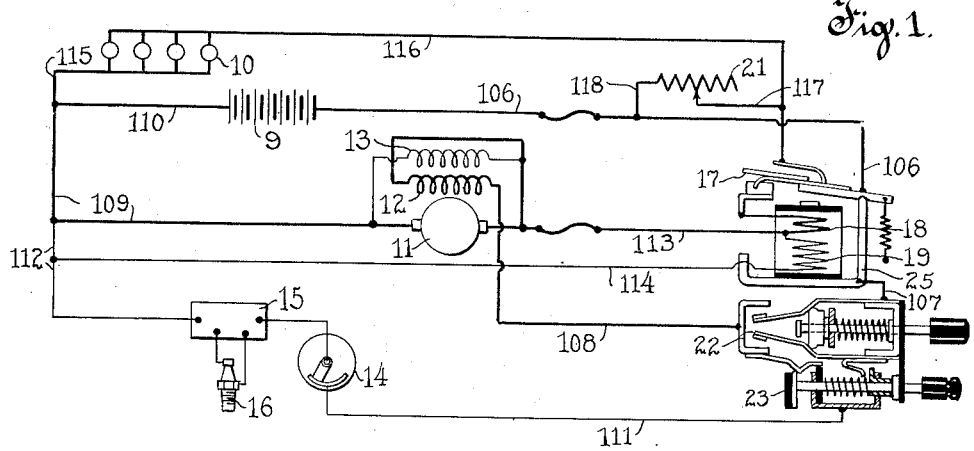
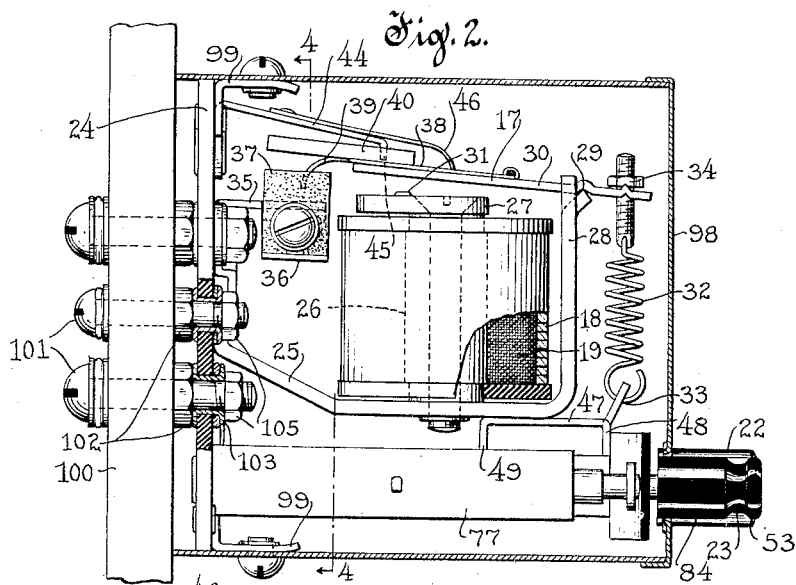
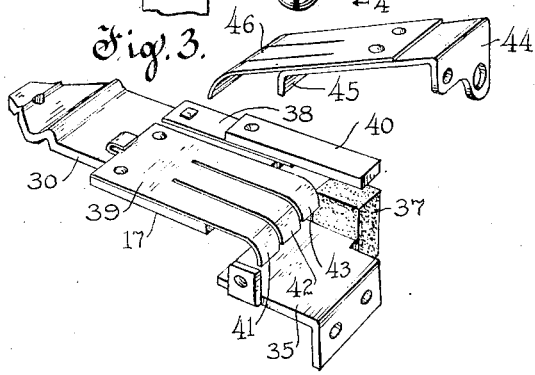
INVENTOR.
Guy R. Radley
BY
ATTORNEY Sept. 8, 1925.
G. R. RADLEY
1,552,446
ELECTRICAL CONTROL APPARATUS
Filed Aug. 21, 1919
2 Sheets-Sheet 2
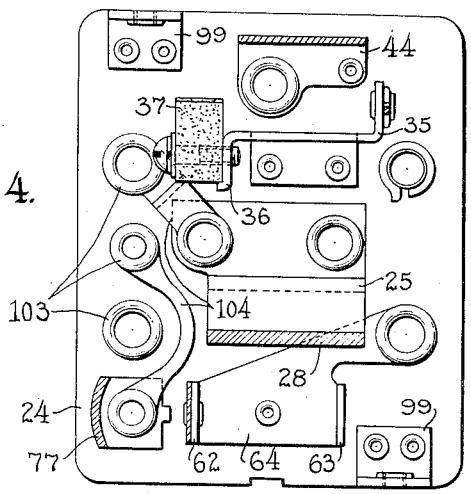
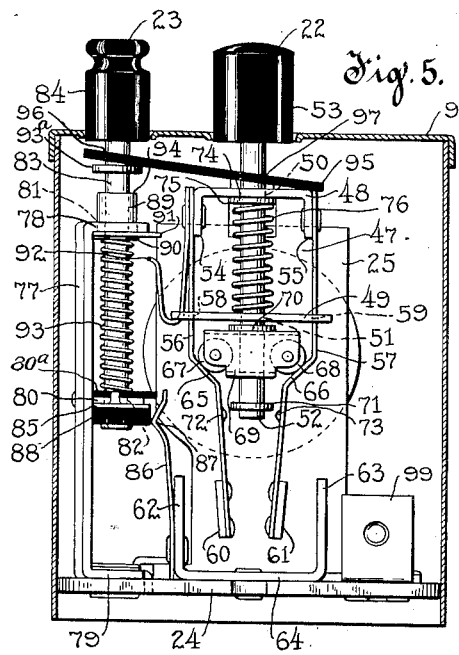
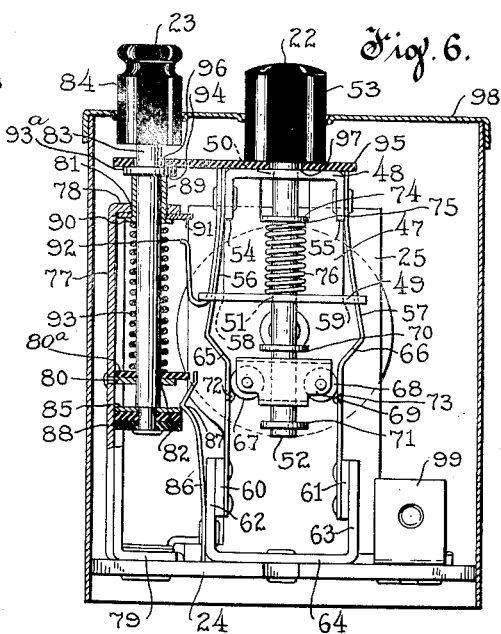
INVENTOR.
Guy R. Radley
BY
ATTORNEY Patented Sept. 8, 1925.

1,552,446

UNITED STATES PATENT OFFICE.

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRICAL CONTROL APPARATUS.

Application filed August 21, 1919. Serial No. 318,873.

*To all whom it may concern:*

Be it known that I, GUY R. RADLEY, a citizen of the United States, residing at Milwaukee, in the county of Milwaukee and State of Wisconsin, have invented new and useful Improvements in Electrical Control Apparatus, of which the following is a full, clear, concise, and exact description, reference being had to the accompanying drawing, forming a part of this specification.

This invention relates to electrical control apparatus, and while not limited thereto is particularly applicable to so-called farm lighting systems.

In such systems it is customary to employ a storage battery and a dynamo electric machine driven by an internal combustion engine, such machine being used as a generator to charge the battery and as a motor for cranking the engine, and the present invention has among its objects to provide therefor a simple and reliable controller of compact construction for effecting all necessary circuit changes.

Another object is that of providing a more sensitive controller of the character stated requiring, moreover, a minimum of personal attention and wherein the possibility of improper manipulation is also minimized.

Another object is that of providing a switch mechanism controllable by a single actuating member and operable otherwise automatically for initiating the charging operation while effecting variation of the armature and field circuit connections of the dynamo electric machine and of the load circuit.

Another object is that of providing, in conjunction with the foregoing instrumentalities, devices interlocked therewith but operable independently thereof for variation of the control under abnormal conditions.

Another object is that of providing a controller of the character aforestated adapted to effect automatic return movement of its parts to their appropriate positions following unwarranted displacement thereof.

Another object is that of providing a switch structure of the character aforestated adapted to co-operate with certain standard fixed parts of existing devices for electrical connection and mechanical support jointly without physical alteration of any part, and readily removable therefrom as a unit.

Other objects and advantages will hereinafter appear.

In the accompanying drawings, wherein is illustrated an embodiment of the invention—

Figure 1 is a schematic view thereof illustrating diagrammatically the circuit connections controlled thereby;

Figure 2 is a side elevational view of the same;

Figure 3 is a fragmentary perspective view illustrating certain details thereof;

Figure 4 is a vertical sectional view substantially on line 4—4 of Figure 2;

Figure 5 is a bottom plan view of the device; while,

Figure 6 is a view similar to Figure 5 but illustrating certain parts in altered relations.

Referring to Fig. 1 of the drawing, the same illustrates a storage battery 9 adapted to supply current to a load circuit indicated generally at 10 and a dynamo electric machine having an armature 11, a series field winding 12 and a shunt field winding 13, to be driven as a generator by an internal combustion engine indicated by the timer 14, coil 15 and ignition plug 16 and adapted to be cranked by said machine acting as a motor. An electro-responsive main switch 17 having a series winding 18 and a shunt winding 19 is adapted to control the connection between the battery and the dynamo electric machine for charging. Said main switch carries an auxiliary contact adapted to include a suitable resistive device 21 in the load circuit for protecting the lamps or other load devices during charging of the battery and to short circuit said resistance device at the termination of the charging operation. A manually operable starting switch 22 is provided for connecting said dynamo electric machine across the battery to effect cranking of the engine thereby, the connections controlled by said main and starting switches being such as to provide for energization of both the shunt and series fields of the dynamo electric machine during operation thereof as a motor and to provide energization of only the shunt field during operation of said machine as a generator, the latter type of field excitation being better adapted to effect an inherent taper of the charging current. A manually operated ignition switch 23 is interlocked with the starting switch 22 for controlling the ignition circuit of the engine, such interlock providing for operation of said switches jointly through actuation of the starting switch while permitting operation of the ignition switch independent of the starting switch.

The switch mechanism, illustrated in Figs. 2 to 6, includes an insulating base 24 providing a support for the various switches aforementioned. The main switch 17 comprises a magnetic frame 25 rigidly secured to the base 24 and extending forwardly therefrom. A vertically extending magnetic core member 26 is bolted to the central portion of said frame and provided at its upper end with a magnetic pole piece 27. The shunt and series windings of said switch are mounted upon said core member, the shunt winding comprising a relatively large number of turns of fine wire arranged adjacent the core and the series winding comprising a relatively small number of turns of coarse wire located outside said shunt winding.

Said magnetic frame is provided with a vertically extending portion 28 terminating in a knife edge 29. A magnetic armature 30 is pivoted upon said knife edge and adapted to co-operate magnetically with the pole piece 27 aforedescribed, the latter being relatively heavy and being furthermore extended eccentrically of the core 26 in a direction away from the knife edge 29, to increase the mechanical advantage of the pull exerted by said windings for attracting said armature. A nonmagnetic stop 31 is interposed between said pole piece and said armature to limit movement of the latter toward the former and to prevent sealing thereagainst. A tension spring 32 having one end anchored at a fixed point 33 and having its opposite end adjustably carried upon a second knife edge device 34 serves to balance the magnetic pull of the windings 18 and 19 and also to effect opening of the switch under predetermined electrical conditions. A plurality of electrically connected contacts are secured to the armature 30 for movement therewith and arranged to project beyond the free end thereof, while a plurality of electrically connected fixed contacts are rigidly secured to the base 24 to be engaged by said movable contacts.

Said fixed contacts comprise an angularly bent and relatively heavy bar 35 of copper clamped to said base and having its major portion projecting forwardly therefrom, said projecting portion being further provided with a downwardly extending lug 36 to which is bolted a relatively heavy block 37 of carbon adapted to extend an appreciable distance above the upper surface of said projecting portion and to be in electrical connection therewith.

The movable contacts comprise a relatively narrow strip 38 and a wider sheet 39 of resilient conductive material riveted or otherwise secured to the armature 30 and projecting therebeyond toward the fixed contacts aforedescribed. The strip 38 carries at its free end a permanently secured and relatively heavy bar 40 of copper, adapted to co-operate with the carbon block 37 in a manner to constitute therewith the arcing contacts of the switch, said contacts being in practice the first to engage and the last to separate.

The sheet 39 is longitudinally slit from its free end backward throughout a major portion of its length thus providing a plurality of connected but relatively movable leaf contacts 41, 42 and 43. The free ends of said contacts are bent downward and spaced unequal distances from their common co-operating contact 35 and greater distances than that between said arcing contacts, while the switch remains open. The foregoing arrangement provides for progressive engagement of said contacts upon downward movement of the armature 30.

A further angularly bent conductive member 44 is rigidly secured to the base 24 and provided with a forwardly and downwardly extending portion 45 projecting above the movable contacts last described to act as a stop for limiting opening movement of the switch.

A resilient conductive strip 46 having one end longitudinally slit is riveted at its opposite end to said member 44 and constitutes the back or auxiliary contact of the switch, being arranged to be positively and resiliently engaged by the contact member 39 just prior to full opening movement of the armature 30.

The starting switch 22 is mounted below the main switch and includes a U-shaped conductive bracket having a central portion 47 and end portions 48 and 49, being riveted at said contral portion to the lower surface of the magnetic frame 25 and said end portions extending downwardly therefrom. Said end portions 48 and 49 are centrally bored to provide registering openings 50 and 51 to receive a reciprocable operating rod 52 having a push button 53. The portion 48 has its sides bent backwardly to form lugs 54 and 55. A pair of resilient arms 56 and 57 are riveted to said lugs respectively in such relation as to extend backwardly of the switch structure and to be received within suitably located channels 58 and 59 of the portion 49 of said bracket. Said resilient arms are provided at their free ends with contacts 60 and 61 adapted to engage the forwardly projecting ends 62 and 63 of a second U-shaped conductive bracket 64 which is riveted at its central portion to the switch base 24. Said resilient arms are further provided medially thereof with oppositely arranged cam surfaces 65 and 66 adapted to be engaged by a pair of rollers 67 and 68 carried by a crosshead 69, said crosshead in turn being carried upon the rod 52. Said rod is provided near its inner end with a pair of rigidly secured disks providing opposing shoulders 70 and 71 spaced a distance greater than the axial length of the crosshead 69 and adapted upon reciprocation of said rod to engage the opposite sides of said crosshead, thus providing a lost motion connection whereas the inner sides of the respective resilient arms are provided with oppositely located stops 72 and 73 adapted to block the rollers 67 and 68 respectively for limiting inward movement of the crosshead. The rod 52 is provided near its opposite end with an additional rigidly secured disk 74 providing a shoulder 75 while a compression spring 76 is mounted upon said rod between said last mentioned shoulder and the bracket member 49, said spring thus serving to bias the rod outwardly of the switch mechanism. The disk 74 is adapted to engage the bracket member 48 for limiting outward movement of the rod and its connected parts.

Upon actuation of the push button 53 the crosshead 69 is forced inward causing the rollers to pass over the respective cam surfaces 65 and 66 and thereby spreading the arms 56 and 57, said rollers being adapted to pass the crests of said cam surfaces just after the contacts 60 and 61 engage their joint fixed contact, thus providing for firm retention of said contacts in such engagement, the spring 76 being also placed under tension. Upon release of said push button such tension of the spring insures outward movement of the rod 52. During such movement the lost motion between the disk 71 and the crosshead 69 is first taken up, said crosshead thereafter moving with the rod until the rollers pass the crests of their respective cams, whereupon the crosshead moves forward with great rapidity, such action obviously serving to open the circuit substantially instantaneously at two electrically parallel points.

The ignition switch 23 is located at one side of the starting switch last described and includes an elongated bracket 77 having angularly arranged end portions 78 and 79, the end portion 79 being riveted to the switch base 24 and the major portion of said bracket member extending forwardly therefrom. Said bracket 77 is provided medially thereof with an integral or rigidly secured lug 80 extending therefrom in a direction substantially parallel with the end portions 78 and 79 thereof, said lug and the end portion 78 being provided with registering openings 81 and 82 to receive a reciprocable rod 83 provided with a push and pull operating member 84. Said rod carries at its inner end a relatively thin contact 85 arranged in a plane at right angles to the axis of said rod and having opposed straight edges, one of said edges being adapted to engage and to be guided by the adjacent surface of the bracket 77, the opposite edge of said contact being adapted in one position of the rod to engage a relatively stationary but resilient contact 86. Said last mentioned contact comprises a relatively thin strip of resilient conductive material riveted at one end to and in electrical connection with the bracket 64 of the starting switch and having its free end adapted to abut an insulating stop 80ª upon the lug 80 for limiting movement of said contact in one direction. An intermediate portion 87 of said contact is bent to approximately V-shape and adapted to engage above the adjacent edge of the movable contact 85 both for making electrical connection therewith and for releasably retaining said contact and its operating rod 83 in a position to maintain such connection irrespective of vibration. Said rod is further provided beyond said movable contact with one or more insulating members 88 having their edges arranged flush with the corresponding edges of said contact, thus providing a seat or buffer for the V-portion 87 of the contact when the switch occupies its off position.

A sleeve 89 having an annular flange 90 is fitted loosely within the opening 81 of the bracket 77 and adapted to surround the rod 83, said flange being provided with an extension 91 projecting toward the starting switch mechanism and adapted in one position of the rod 83 to engage a resilient contact 92 which is riveted to and in electrical connection with the resilient arm 56 of the starting switch 22. A compression spring 93 is coiled about the rod 83 between the lug 80 and the flange 90, said spring thus serving to maintain said sleeve extension 91 out of engagement with said fixed contact 92. A disk 93ª is rigidly secured to the rod 83 and adapted upon a relatively prolonged inward movement thereof to engage an adjacent shoulder 94 of said sleeve for effecting inward movement of the latter.

Upon a predetermined slight inward actuation of the operating member 84 the contact 85 is moved from its off position illustrated into its intermediate or normal running position in which position said contact is in engagement with the fixed contact 86. In this position, moreover, the spring 93 is not compressed and the detent relation of said contacts aforedescribed is sufficient to insure retention of the switch parts in such relation unless positively actuated to a different position. Upon further inward movement of the operating member 84 the disk 93 first engages the shoulder 94 of the sleeve 89 the latter being thereafter forced inwardly against the bias of spring 93 and into engagement with the contact 92, whereas obviously upon release of the switch when in such position the same is adapted to move automatically to its intermediate or running position last described owing to the bias of said spring and restraint by the contact 85.

A bar 95 of insulating material having openings 96 and 97 is loosely mounted upon the rod 52 between the push button 53 thereof and the bracket member 48 and at its opposite end is adapted to surround the rod 83 at a point between its operating member 84 and the disk 93, thereby providing a one-way interlock between the aforedescribed switches. Thus upon pushing in the push button 53 the end of said insulating bar 95 surrounding the rod 83 is also forced inward and by its reaction against the disk 93 serves to force said rod and its attached contacts inward to the intermediate position thereof, said ignition switch being thereafter adapted to maintain such position irrespective of subsequent release of the starting switch. Moreover the arrangement is such that while the starting switch remains open the ignition switch may be freely operated in either direction without influence upon said starting switch.

The aforedescribed switch parts are in practice preferably enclosed within a suitable metallic housing 98 through which the operating buttons 53 and 84 extend, said housing being in practice releasably secured to the switch base by means of brackets 99.

The entire switch mechanism is supported by and readily removable from a fixed insulating panel 100 which may be of standard construction, said panel having the usual terminal studs 101 extending forwardly therethrough and provided upon the front thereof with clamping nuts 102 for drawing in said studs to secure the various conductors carried upon the panel. In the present case, however, said studs are extended forwardly an appreciable distance beyond their respective clamping nuts to provide both terminal connections and physical support for the aforedescribed switch mechanism.

The switch base 24 is provided with openings so located as to register with the projecting ends of said studs, said openings being oversized to receive hollow rivets 103 which serve to secure the switch parts to said base and also for the securement of busbars 104 adapted to electrically connect the appropriate elements of the several switches, said rivets being of suitable internal diameter to slip over said studs and the latter being terminally screwthreaded to receive additional clamping nuts 105 for releasably securing the switch mechanism to the panel. The housing 98 is preferably extended backward beyond the switch base 24 to abut the panel 100 and inclose the space between said base and said panel.

By the foregoing arrangement, upon removal of the housing and subsequently unscrewing the nuts 105 the entire switch mechanism may be readily removed as a unit and replaced by a similar complete mechanism without in any wise disturbing the studs or the electrical connections upon the back of the panel.

The manner of operation of the aforedescribed mechanism may be described as follows: The main switch being open and the manually operable switches being in the positions illustrated in Fig. 5, upon actuating the starting push button 53 circuit is completed from the right hand terminal of the battery by conductor 106 through the frame 25 of the main switch 17, thence by conductor 107 through the starting switch 22, thence by conductor 108 through the series field and armature of the dynamo electric machine, and by conductors 109 and 110 to the opposite battery terminal, the foregoing connections also serving to energize the shunt field 13. Said machine being thus directly connected across the battery is adapted to act as a motor for cranking the engine. Also, practically at the moment of closure of the starting switch the ignition switch 23 is moved to its mid-position, thus connecting the ignition coil of the engine directly across the aforedescribed joint circuit of the battery and armature, by connections extending from the frame 64 of the starting switch, through contacts 86 and 85 of said ignition switch to the frame 77, thence by conductor 111 through the timer 14 and coil 15 and thence by conductor 112 to conductor 109 of said joint circuit, said frame 64 of the starting switch being in permanent electrical connection with the armature 11 and being also connected with the battery so long as the starting switch is maintained closed.

The dynamo electric machine is thereupon adapted to act in a well known manner, first as a motor for cranking the engine and thereafter as a generator as soon as the engine develops sufficient power to drive the former above its speed as a motor under the battery energization.

At this point the main switch 17 is adapted to close under action of its shunt winding 19 which is permanently connected to the armature by connections extending from the right hand pole of said armature 11 by conductor 113 through said shunt winding, thence by conductors 114, 112 and 109 to the opposite pole of said armature. Said shunt winding has just sufficient pull to effect engagement of the copper to carbon contacts of the main switch, which contacts, however, are adequate to transmit temporarily the value of current developed by the machine under existing conditions. Moreover, the battery charging circuit completed by such engagement of said contacts includes the series winding 18 of said main switch, said circuit extending from the right hand pole of the armature 11 by conductor 113 and through said series winding 18, thence through said copper to carbon contacts and through the armature 30 of said main switch, thence by conductor 106 through the battery and by conductors 110 and 109 to the left hand pole of the armature 11. Energization of said series winding and concurrent increase in the speed and output of the machine serve to draw in the switch armature 30 by an amount sufficient to effect engagement of at least one of the leaf contacts with their common fixed contact, whereas as the current through said series winding continues to increase due to acceleration of the machine said switch armature is drawn down to its full extent for effecting progressive engagement of its remaining contacts, thus adapting the switch to carry the increased current developed.

Closure of the main switch serves to shunt the starting switch, which latter switch may obviously be released and permitted to open as soon as the engine is operating under its own power. Thus the starting switch under normal conditions is not required to break any appreciable current. However, should the engine for any reason require repeated electrical cranking, said switch would upon opening be required to break the full cranking current of the battery for which reason the aforedescribed quick separation and parallel break features of said switch are provided. Opening of the starting switch obviously serves to disconnect the engine ignition coil from the battery, leaving the former connected across the circuit of the dynamo electric machine only.

Closure of the main switch also shunts the series field 12 of said machine, said series field being thereafter traversed merely by the ignition current for the engine, which current is insufficient to energize said winding appreciably.

Closure of the main switch further serves to vary the connections of the load circuit to include therein the protective device 21, which in practice may comprise a dimmer or a suitably arranged counter-cell, said load circuit under such conditions extending from the left hand terminal of the battery by conductors 110 and 115 through the various load devices 10, thence by conductors 116 and 117 through said protective device 21 and by conductors 118 and 106 to the opposite pole of the battery. Obviously so long as said main switch remains open, the auxiliary contact thereof serves to short circuit said protective device by connecting conductors 107 and 116 directly.

The shunt and series windings of the main switch are so wound and connected as to act cumulatively so long as the same are energized by current from the armature of the dynamo electric machine, whereas from inspection of Fig. 1 it is apparent that upon energization of said windings from the battery the polarity of the series winding only is reversed whereby said windings are adapted to oppose each other under the latter conditions.

Said windings, moreover, are so arranged and proportioned with reference to the adjustable spring 32 as to maintain the switch closed for a limited time following diminution or discontinuance of the engine power supply such as might occur upon partial or temporary choking of its carburetor, thus affording the engine an opportunity to clear itself and even assisting in such action through temporary motorization of the dynamo electric machine. However, the foregoing parts are designed and adjusted to provide for positive opening of the switch at a predetermined value of reverse current which value is necessarily less than that required to maintain protracted rotation of said machine with the engine idle.

Also owing to the foregoing arrangement, should said main switch be forcibly closed through accidental or intentional interference by an extraneous agency under any conditions wherein said machine is not acting as a generator, said switch when relieved of the action of such agency, will open automatically, the pull component of its opposed windings being insufficient to overcome the opening force of the spring 32. This feature positively protects the switch against damage or probable destruction thereof and of its associated parts such as would be likely to occur should the switch remain closed under the conditions stated.

Stopping of the engine and termination of the charging operation are effected by pulling out the ignition switch to its extreme outer position, thereby interrupting the engine ignition circuit. The main switch being adapted thereafter to effect disengagement of its contacts progressively, the final arc being broken between the copper to carbon contacts aforedescribed.

If, for any reason, it becomes necessary to start the engine otherwise than by the dynamo electric machine, the ignition switch is pushed inward to its extreme position thereby completing the ignition circuit from the right hand terminal of the battery by conductor 106 through the frames 25 and 48 of switches 17 and 22 respectively, said switches being open, thence through contacts 92 and 91 of said ignition switch to the frame 77 thereof and by conductor 111 through the timer and coil to the opposite terminal of the battery as formerly traced. Upon release of said ignition switch following starting of the engine by hand cranking or otherwise, said switch is adapted, owing to the action of the spring 93, to return automatically to its normal running position wherein the ignition coil is energized from the armature circuit as aforedescribed. This arrangement insures against inadvertently leaving the ignition switch in a position to connect said coil across the battery and thereby provides against burning out the coil should the engine for any reason stop with its timer contacts in engagement.

What I claim as new and desire to secure by Letters Patent is:

1. In an electrical controller, in combination, a storage battery, a generator, a switch to connect said battery and said generator for charging the former, said switch comprising a plurality of pairs of contacts adapted for progressive engagement, and operating means for said switch comprising separately energized coils, certain of said coils being adapted to effect engagement of certain of said contacts to thereby provide an energizing circuit for other of said coils, said coils thereafter acting cumulatively to effect engagement of other of said contacts.

2. In an electrical controller, in combination, a storage battery, a generator, a switch to connect said battery and said generator for charging the former, said switch comprising a plurality of pairs of contacts adapted for progressive engagement, and operating means for said switch comprising separately energized coils, certain of said coils being adapted to effect engagement of certain of said contacts to thereby provide an energizing circuit for another of said coils, said coils thereafter acting cumulatively to effect engagement of other of said contacts, certain of said contacts to be held in engagement by one of said coils irrespective of a material value of reverse energization of another of said coils.

3. In an electrical controller, in combination, a storage battery, a dynamo electric machine, an internal combustion engine to drive said machine as a generator for charging said battery, said machine being adapted to act as a motor for cranking said engine, a switch to connect said battery and said generator during the charging operation, said switch comprising a plurality of contacts adapted to engage progressively, and shunt and series operating coils for said switch, said coils acting cumulatively to effect engagement of all of said contacts, and said shunt coil acting to maintain certain of said contacts closed notwithstanding a material reverse energization of said series coil due to predominance of the battery voltage.

4. In an electrical controller, in combination, a storage battery, a load circuit to be supplied thereby, a generator, a switch to connect said battery and said generator for charging the former, said switch comprising a plurality of contacts to engage progressively, and operating means for said switch comprising shunt and series coils, said coils acting cumulatively to provide for engagement of said contacts under a predetermined value of generated voltage, to effect positive opening of said switch under a predetermined value of current discharging from said battery, to maintain certain of said contacts in engagement under conditions of material values of such reverse current below such predetermined value, said switch being adapted to effect suitable variation of said load circuit upon engagement and disengagement of said contacts respectively.

5. In an electrical controller, in combination, a storage battery, a generator, a switch to connect said battery and said generator for charging the former, said switch comprising a plurality of pairs of contacts adapted for progressive engagement, and operating means for said switch comprising shunt and series coils, said shunt coil being adapted to effect engagement of certain of said contacts, said coils thereafter acting cumulatively to effect engagement of all of said contacts, certain of said contacts being held in engagement by said shunt coil irrespective of a material value of reverse energization of said series coil.

6. In an electrical controller, in combination, a storage battery, a dynamo electric machine, an internal combustion engine to drive said machine as a generator for charging said battery, said machine being adapted to act as a motor for cranking said engine, a switch to connect said machine across said battery for motorization of said machine, and an ignition switch interlocked with and operable by said starting switch and coacting therewith to connect the ignition circuit of said engine across said battery and said machine jointly, said starting switch being thereafter operable automatically when released to interrupt the connection of said ignition circuit across said battery.

7. In an electrical controller, in combination, a storage battery, a dynamo electric machine, an internal combustion engine to drive said machine as a generator for charging said battery, said machine being adapted to act as a motor for cranking said engine, a switch to connect said machine across said battery for motorization of said machine and an ignition switch interlocked with and operable by said starting switch to coact therewith to connect the ignition circuit of said engine across said battery and said machine jointly, said ignition switch having means operable independently of said starting switch for connecting said ignition circuit across said battery only.

8. In an electrical controller, in combination, a storage battery, a dynamo electric machine, an internal combustion engine to drive said machine as a generator for charging said battery, said machine being adapted to act as a motor for cranking said engine, a switch to connect said machine across said battery for motorization of said machine and an ignition switch interlocked with and operable by said starting switch to a predetermined position to coact with said starting switch for connecting the ignition circuit of said engine across said battery and said machine jointly, said ignition switch having means operable independently of said starting switch for positioning the former to connect said ignition circuit across said battery only, and means for effecting biased return of said ignition switch to said first mentioned position when released.

9. In an electrical controller, in combination, a storage battery, a dynamo electric machine, an internal combustion engine to drive said machine as a generator for charging said battery, said machine being adapted to act as a motor for cranking said engine, a starting switch to connect said machine across said battery for motorization of said machine, said switch having an on position and an off position, an ignition switch having extreme on and off positions and an intermediate on position and interlocking means for said switches for effecting predetermined positioning of said ignition switch upon movement of said starting switch to its on position while permitting retention of said ignition switch in such position irrespective of return movement of said starting switch to off position.

10. In an electrical controller, in combination, a storage battery, a dynamo electric machine, an internal combustion engine to drive said machine as a generator for charging said battery, said machine being adapted to act as a motor for cranking said engine, a starting switch to connect said machine across the battery for motorization of said machine, said switch having an on position and an off position, means biasing said switch to its off position, an ignition switch having extreme on and off positions and an intermediate on position, means biasing said ignition switch out of said extreme on position and interlocking means for said switches providing for a predetermined operation of said ignition switch upon actuation of said starting switch to its on position while permitting independent movement of said ignition switch to any of its positions so long as said starting switch remains in its off position.

11. In an electrical controller, in combination, a storage battery, a dynamo electric machine, an internal combustion engine to drive said machine as a generator for charging said battery, said machine being adapted to act as a motor for cranking said engine, a starting switch to connect said machine across the battery for motorization of said machine, said switch having an on position and an off position, means biasing said switch to its off position, an ignition switch having extreme on and off positions and an intermediate on position, means biasing said ignition switch out of said extreme on position and interlocking means for said switches providing for a predetermined operation of said ignition switch upon actuation of said starting switch to its on position, while permitting said ignition switch to remain in said intermediate position upon biased return of said starting switch to off position.

12. In an electrical controller, a storage battery, a dynamo electric machine, an internal combustion engine to drive said machine as a generator for charging said battery, said machine being adapted to act as a motor for cranking said engine, a starting switch to connect said machine across said battery for motorization of said machine, said switch having an on position and an off position, an ignition switch having extreme on and off positions and an intermediate on position, means biasing said ignition switch out of said extreme on position, means operable by said starting switch for effecting intermediate positioning of said ignition switch, the latter having means for releasably retaining the same in such position, and means for effecting independent operation of said ignition switch to any of its positions while said starting switch remains in its off position.

In witness whereof I have hereunto subscribed my name.

GUY R. RADLEY.